United States Patent [19]

Bonga

[11] 4,168,419
[45] Sep. 18, 1979

[54] APPARATUS FOR RADIALLY DISPLACING THE ELECTRODE OF AN EDM MACHINE SIMULTANEOUSLY WITH THE LONGITUDINAL DISPLACEMENT OF THE ELECTRODE

[75] Inventor: Benno I. Bonga, Crans, Switzerland

[73] Assignee: Ateliers des Charmilles, S.A., Geneva, Switzerland

[21] Appl. No.: 832,936

[22] Filed: Sep. 13, 1977

[30] Foreign Application Priority Data

Sep. 15, 1976 [CH] Switzerland .................. 11692/76

[51] Int. Cl.$^2$ .............................................. B73K 9/16
[52] U.S. Cl. .................................. 219/69 V; 409/193
[58] Field of Search ................. 219/69 V, 69 E, 69 R, 219/69 M; 74/69, 117; 90/15 B

[56] References Cited

U.S. PATENT DOCUMENTS

| 3,539,754 | 11/1970 | Fuaze et al. | 219/69 V |
| 3,809,852 | 5/1974 | Weber | 219/69 V |
| 3,919,516 | 11/1975 | Ullmann et al. | 219/69 E |

FOREIGN PATENT DOCUMENTS 2238698  2/1974  Fed. Rep. of Germany ........ 219/69 V Primary Examiner—Bruce A. Reynolds
Attorney, Agent, or Firm—Hauke and Patalidis

[57] ABSTRACT

An apparatus for displacing at least one of the electrodes of an electrical discharge machine laterally in a plane perpendicular to the axis of relative longitudinal feed of the electrodes, with an amplitude proportional to the longitudinal displacement of the electrodes. The apparatus comprises a rotatable shaft longitudinally controlled as a function of the axial position of one of the electrodes. An eccentric member is driven in rotation by the shaft, and the amount of eccentricity of rotation of the eccentric member is controlled by a moveable camming member supported at three points, one of the points being a fixed pivot point on the axis of the shaft and the two other points having an axial position and a radial position varying as a function of the longitudinal displacement of the shaft and defining the amount of eccentricity of the eccentric member.

6 Claims, 8 Drawing Figures

APPARATUS FOR RADIALLY DISPLACING THE ELECTRODE OF AN EDM MACHINE SIMULTANEOUSLY WITH THE LONGITUDINAL DISPLACEMENT OF THE ELECTRODE

BACKGROUND OF THE INVENTION

The present invention relates to electrical discharge machining, EDM, and more particularly to an arrangement of elements for laterally displacing one of the electrodes of an EDM machine in a plane perpendicular to the axis of feed of the electrode. The present invention relates generally to a mechanism which has come to be known as an orbiting mechanism for curvilinearly translating an electrode, in an EDM machine, in a transverse plane perpendicular to the longitudinal axis of feed of the electrode relative to the other electrode, one of the electrodes being a tool electrode and the other being the workpiece.

It is known to machine, by EDM, a workpiece electrode by means of a tool electrode by longitudinally feeding one of the electrodes relative to the other while simultaneously translating one of the electrodes in a plane perpendicular to the feed axis, and to provide means for displacing in the translation plane an eccentric member as a function of the relative longitudinal axial position of the electrodes with an amplitude proportional to the axial displacement of a shaft whose axis is parallel to the axis of feed. The amplitude, or amount of eccentricity, is caused to increase from a predetermined amount of eccentricity for a given relative position of one electrode relative to the other, the axial relative displacement of the shaft relative to the eccentric member being controlled such as to maintain predetermined electrical discharge machining conditions in the machining zone between the electrodes.

Such an arrangement of elements is disclosed, for example, in U.S. Pat. No. 3,539,754 and in the German Published Patent Application No. 2,238,698.

The present invention is an improvement of such apparatus and accomplishes the result of providing a simple and low-cost device while permitting to achieve the close tolerance which must be respected between the amplitude of the radial displacement and the amount of relative axial displacement of the electrodes.

SUMMARY OF THE INVENTION

The present invention has for principal object to provide at least one intermediary moveable camming element interconnecting a shaft whose longitudinal displacement is controlled as a function of the axial position of one of the electrodes, such intermediary element cooperating with both the shaft and with an eccentric and being arranged to be rotated by the shaft and to be displaceable in a plane parallel to the axis of rotation of the shaft. The intermediary element is supported at three points, one of which is fixed relative to the axial position of the shaft, and the other two of which have respectively each a predetermined axial position and a predetermined radial position relative to the eccentric member.

BRIEF DESCRIPTION OF THE DRAWING

The attached drawing represents schematically and for illustrative purposes only, a structural embodiment and three modifications of an apparatus according to the present invention. In the attached drawing wherein like reference numerals refer to like or equivalent elements.

DETAILED DESCRIPTION OF THE PREFERRED EMBODIMENTS

Figures 1, 2:
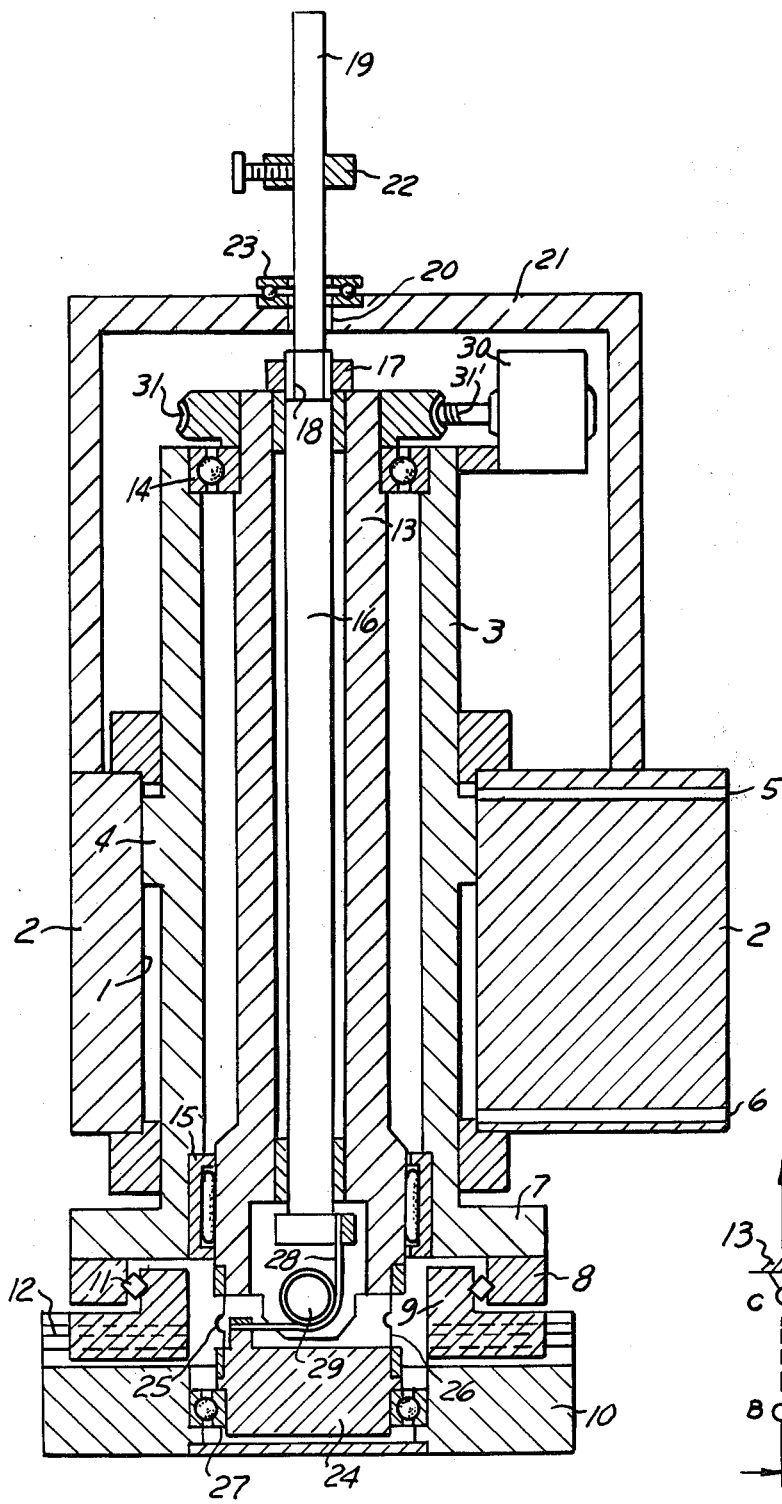
FIG. 1 is a longitudinal section of a structural embodiment of the present invention.
FIG. 2 is a schematic diagram useful in explaining the operation of the structure of FIG. 1.

FIG. 1 illustrates, in longitudinal section, a holder for the tool electrode, not shown, of an EDM apparatus, which is arranged to cause the tool electrode to be driven in a translation motion, circular or radial, having an amplitude which is a function of the axial displacement of the electrode away from a predetermined reference position of penetration within the workpiece electrode.

As shown at FIG. 1, a bore 1 is disposed in a housing 2 which is fixedly supported by the frame, not shown, of an EDM apparatus. A sleeve 3 is slidably disposed in the bore 1, the sleeve 3 being provided with an enlarged diameter portion defining a piston portion 41. The longitudinal displacement of the piston 4, and consequently of the sleeve 3, is effected by means of a pressurized hydraulic fluid which is introduced on one side or the other of the piston 4 by means of passageways 5 and 6.

The bottom of the sleeve 3 is provided with a flange 7 fixedly supporting a saddle 8 which slidably supports a slide 9 which in turn slidably supports a second slide 10, the directions of motion of the slides 9 and 10 being at right angles to each other, and the slide 9 being supported by the saddle 8 by means of a linear bearing 11, while the slide 10 is supported from the slide 9 by means of a linear bearing 12.

A tubular shaft 13 is rotatably supported within the sleeve 3 by means of end bearings 14 and 15. A rod 16 adapted for longitudinal displacement relative to the tubular shaft 13 is supported concentric with the tubular shaft 13. The stroke of the rod 16 relative to the tubular shaft 13 is adjustably limited downwardly by an abutment 17 in the form of a ring threading on a peripherally threaded portion 18 of the rod 16.

The upper end of the rod 16 is of reduced diameter, as shown at 19, and passes through an aperture 20 formed in a housing 21 affixed to the support housing 2. The reduced diameter end portion 19 of the rod 16 supports an axially adjustable abutment 22 capable of engagement with the upper face of the race of a thrust bearing 23 freely surrounding the rod 19 and supported by the housing 21.

The tubular shaft 13 is connected, at its lower end, to an eccentric member 24 by means of flexible spring blades 25 and 26. The eccentric member 24 cooperates in addition, through the intermediary of ball bearings 27, with the slide 10 by being supported within an appropriate bore disposed in the slide 10.

A moveable coupling member which, in the example illustrated, consists of a metallic tape or ribbon 28 has one end connected to the lower end of the rod 16 and its other end connected to the eccentric member 24. The metallic ribbon 28 passes over a roller 29, rotatably supported within the lower end of the tubular shaft 13. In this manner, any axial displacement of the rod 16 relative to the tubular shaft 13 causes a radial displacement of equal amplitude of the eccentric member 24, therefore varying the amount of eccentricity of the eccentric member 24 relative to the longitudinal axis of the tubular shaft 13.

The tubular shaft 13 is driven in rotation by means of a motor 30 mounted in the housing 21. For that purpose, the tubular shaft 13 is provided at its upper end with a toothed wheel 31, keyed thereon and meshing with a tangential worm 31' mounted on the output shaft of the motor 30.

The axial displacement of the rod 16 relative to the hollow shaft 13 is limited downwardly by the abutment 17 which is initially adjusted in longitudinal position such that the eccentric member 24 has no eccentricity at a start reference position. At such start reference position, as defined by the position of the adjustable abutment 17, the spring blades 25 and 26 urge the eccentric member 24 to a position axially concentric with the longitudinal axis of the rod 16.

During machining, an appropriate servo control, not shown, supplies fluid under pressure differential through passageways 5 and 6 to displace the sleeve 3 downwardly and thus advance the tool electrode, not shown, mounted on the bottom face of the slide 10 towards the workpiece electrode, also not shown. Simultaneously therewith, the motor 30 drives the tubular shaft 13 in rotation but, because the eccentric member 24 is coaxial with the tubular shaft 13, the slide 10 is not caused to be radially displaced.

As soon as the amount of penetration or feed of the tool electrode into the workpiece reaches a value determined by the setting of the adjustable abutment 22, the abutment 22 engages the upper face of the thrust bearing 23. When this occurs, the rod 16 is prevented from following the longitudinal displacement of the sleeve 3 and tubular shaft 13. Consequently, any subsequent displacement of the sleeve 3 in the direction of feed of the electrode tool causes the rod 16 to pull on the end of the metallic tape 28, thus in turn causing a progressive corresponding increase in the amount of eccentricity of the eccentric member 24 and, consequently, of the amplitude of circular translation motion of the slide 10, as a result of the rotation of the eccentric member 24 driven by the motor 30 through the tubular shaft 13.

FIG. 2 schematically represents in the form of a diagram the connection between the rod 16 and the eccentric member 24. The metallic ribbon 28, for the very small amounts of displacement which are here considered, accomplishes the same results as would be accomplished by a rigid moveable element 40 having three support points disposed in a plane parallel to the axis of rotation of the tubular shaft 13, and consisting of the three points A, B and C disposed at the tips or vertices of an isosceles right triangle. Point A is axially affixed to the rod 16; point C represents the pivot point of the movable element 40 relative to the tubular shaft 13; and point B represents the point of attachment of the moveable part 40 to the eccentric member 24. For every axial displacement of the rod 16, resulting in an axial displacement $\Delta Z$ of point A, there results a radial displacement $\Delta R$ of point B.

Figure 3:
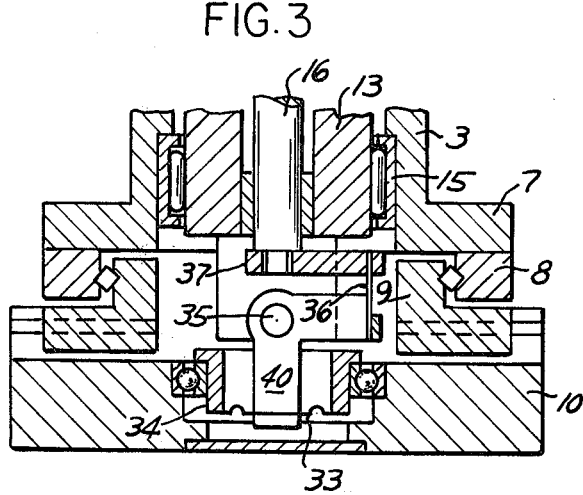
FIGS. 3, 5 and 7 illustrate modifications of the apparatus of FIG. 1.
Figure 4:
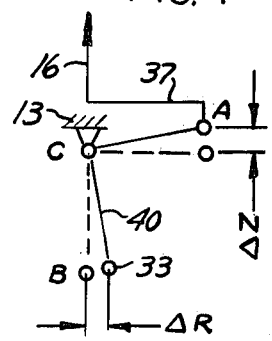
FIGS. 4, 6 and 8 are schematic diagrams useful in explaining the function of the embodiments of FIGS. 3, 5 and 7, respectively.

FIG. 3 illustrates a modification of the invention which functionally corresponds to the schematic diagram of FIG. 4 and which shows only the lower portion of the assembly of elements. At FIG. 3, the lower flange portion 7 of the reciprocating sleeve 3, together with the cross slides 9 and 10 supported by the saddle 8, are shown as mounted at the lower portion of the tubular shaft 13 and of the rod 16. The eccentric member takes the form of a cylinder or ring 34 connected at its lower end by means of a flexible spring blade 33 to the end of an arm of a moveable connecting or camming element in the form of a bent-over lever 40 articulated about a pivot 35 supported within the lower end of the tubular shaft 13. The end of the other arm of the bent-over lever 40 is connected by means of a flexible spring blade 36 to the end of a crank 37 mounted on the lower end of the rod 16.

FIG. 4 is a schematic diagram useful in interpreting the functioning of the embodiment of FIG. 3 and which is alike the schematic diagram of FIG. 2 but, in addition, bears reference numerals corresponding to the elements of FIG. 3.

Figure 5:
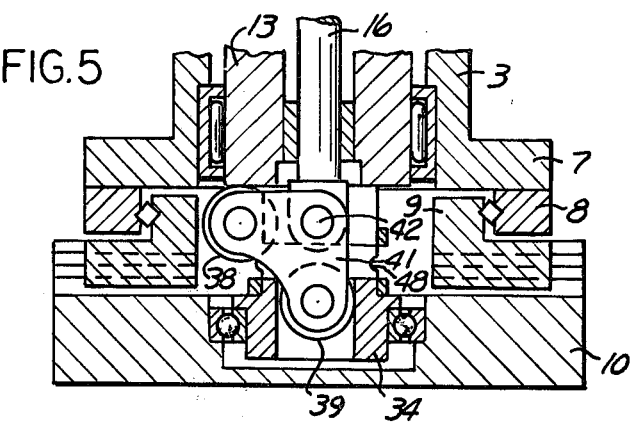

FIG. 5 illustrates another modification of the invention wherein a bent-over lever 41 pivots, as shown at 42, relative to the lower end of the rod 16 and the ends of the lever 41 engage through the intermediary of rollers 38 and 39, respectively the lower end face of the tubular shaft 13 and the inner surface of the eccentric ring 34.

Figure 6:
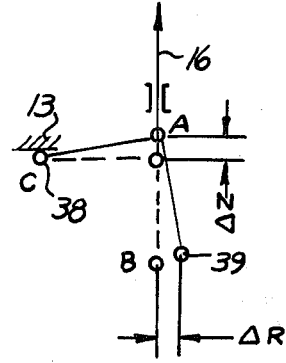

FIG. 6 is a schematic diagram of the arrangement of FIG. 5 and represents the connection between the rod 16, the tubular shaft 13 and the rollers 38 and 39 carried on the end of the arms of the bent-over lever 41. When the tubular shaft 13 is axially displaced of a distance $\Delta Z$ relative to the rod 16, the roller 39 and consequently the eccentric member or sleeve 34 are transversely displaced of an equal distance $\Delta R$, assuming equal lengths for the arms of the lever 41.

Figure 7:
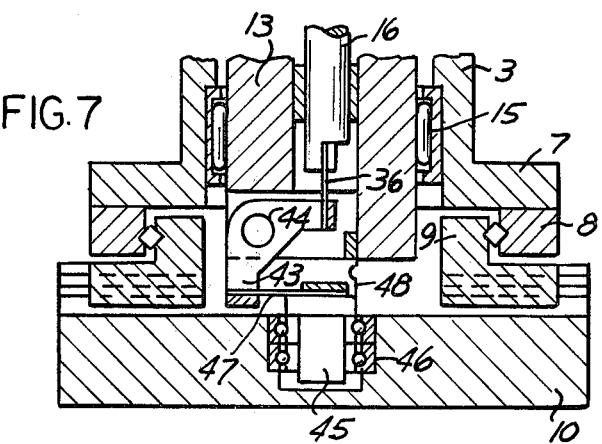
Figure 8:
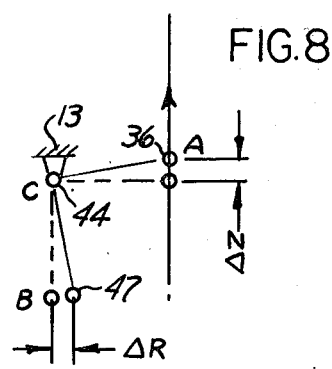

FIG. 7 and the schematic diagram of FIG. 8 illustrate a further modification of the invention wherein the movable eccentric actuating or camming member consists of a bent-over lever 43 articulated about a pivot 44 supported by the tubular shaft 13. The axis of the pivot 44 is offset relative to the axis of the tubular shaft 13, and a flexible blade 36 which connects the end of an arm of the lever 43 to the rod 16 is disposed about the longitudinal axis of the rod 16 and of the tubular shaft 13.

The eccentric member consists of a stub shaft 45 mounted rotatable within an appropriate bore in the slide 10 and supported by bearings 46. The stub shaft 45 is connected to the end of the other arm of the lever 43 by means of a flexible spring blade 47.

Both the embodiments of FIG. 5 and of FIG. 7 are provided with at least one flexible spring blade 48 connecting the end of the tubular shaft 13 with the eccentric member and which, accomplishes the same purpose as the flexible spring blades 25 and 26 of FIG. 1, constantly biasing or urging the eccentric member and the slide 10 to the "start" position as predetermined by the longitudinal position of the adjustable abutment 17, FIG. 1. FIG. 8 is a schematic functional diagram of the arrangement of FIG. 7, the reference numerals therein corresponding to the reference numerals of the elements of FIG. 7.

Having thus described the present invention by way of particular structural embodiments thereof given for illustrative purposes only, modifications whereof will be apparent to those skilled in the art, what is claimed as new is as follows:

1. In an EDM apparatus for machining a workpiece electrode by a tool electrode and comprising means for displacing the electrodes one relative to the other according to a translation lateral motion and to an axis of feed of an electrode relative to the other, an eccentric member displaceable in a plane perpendicular to said axis of feed, a shaft disposed parallel to said axis of feed, and a movable member disposed between said shaft and said eccentric member, said movable member being supported at three points each disposed at a vertex of an isosceles right triangle, wherein one of said points is fixed relative to the axial position of said shaft and the other two of said points are movable and occupy respectively an axial position and a radial position relative to said eccentric member, the improvement comprising means for rotating said movable member in unison with said shaft and said eccentric member and for displacing said movable member in a plane parallel to said shaft, and means for displacing in said plane one of said electrodes according to a translational motion with an amplitude corresponding to the radial displacement of said eccentric member, the other of said electrodes being disposed at a predetermined axial position relative to said shaft.

2. The improvement of claim 1 wherein the vertex of the right angle of said triangle has a fixed radial position relative to said shaft.

3. The improvement of claim 1 wherein the vertex of the right angle of said triangle has a fixed axial position relative to said shaft.

4. The improvement of claim 1 wherein said movable member is a metallic ribbon having a first end attached to said shaft and a second end attached to said eccentric member, the portion of said metallic ribbon between said first and second ends being passed over a roller member having a fixed axis of rotation relative to said axis of feed, whereby said axis of rotation of said movable member defines said fixed point and the ends of said metallic ribbon define said movable points.

5. The improvement of claim 1 wherein said movable member is a bent over lever having a first end attached to said shaft and a second end attached to said eccentric member, said bent over lever being pivotable about a pivot axis disposed at said axis of feed, said pivot axis defining said fixed point, and said bent over lever ends each defining one of said movable points.

6. The improvement of claim 1 wherein said movable member is a bent over lever having a first end provided with a roller member for rolling engagement with a fixed surface and a second end provided with a roller member for engagement with said eccentric member, and a pivot axis disposed at the end of said shaft, whereby said first end defines said fixed point, and said pivot axis and said second end define said movable points.

* * * * *

UNITED STATES PATENT AND TRADEMARK OFFICE
CERTIFICATE OF CORRECTION

PATENT NO. : 4,168,419
DATED : September 18, 1979
INVENTOR(S) : Benno Ibo Bonga

It is certified that error appears in the above-identified patent and that said Letters Patent are hereby corrected as shown below:

Column 2, line 27, change "41" to --4--.

Signed and Sealed this

Fourth Day of December 1979

[SEAL]

Attest:

SIDNEY A. DIAMOND

Attesting Officer — Commissioner of Patents and Trademarks